US012626084B2

(12) United States Patent
Fletcher et al.

(10) Patent No.: US 12,626,084 B2
(45) Date of Patent: May 12, 2026

(54) THERMO-SENSITIVE PAYMENT CARD

(71) Applicant: Block, Inc., Oakland, CA (US)

(72) Inventors: Kyle Fletcher, Briarcliff Manor, NY (US); Ashutosh Dhodapkar, Fremont, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 18/516,610

(22) Filed: Nov. 21, 2023

(65) Prior Publication Data

US 2024/0160883 A1      May 16, 2024

Related U.S. Application Data

(63) Continuation of application No. 17/840,438, filed on Jun. 14, 2022, now Pat. No. 11,861,438, which is a continuation of application No. 17/367,041, filed on Jul. 2, 2021, now Pat. No. 11,416,727.

(51) Int. Cl.
*G06K 19/07* (2006.01)
*G06K 19/077* (2006.01)

(52) U.S. Cl.
CPC ... *G06K 19/0723* (2013.01); *G06K 19/07722* (2013.01)

(58) Field of Classification Search
CPC ..................... G06K 19/0723; G06K 19/07722
USPC ........................................................ 235/492
See application file for complete search history.

(56) References Cited

U.S. PATENT DOCUMENTS

| | | | | |
|---|---|---|---|---|
| 6,457,650 | B1 | 10/2002 | Suzuki et al. | |
| 11,354,555 | B1 * | 6/2022 | Yee ................... | G06Q 20/3672 |
| 11,416,727 | B1 | 8/2022 | Fletcher et al. | |
| 2004/0230558 | A1 | 11/2004 | Tokunaka | |
| 2005/0211785 | A1 | 9/2005 | Ferber et al. | |
| 2008/0290178 | A1 | 11/2008 | Reynolds | |
| 2010/0230487 | A1 * | 9/2010 | Johnson ............. | G06Q 20/3415 235/380 |
| 2013/0191254 | A1 * | 7/2013 | Klintberg ............... | G06Q 40/02 705/30 |
| 2016/0267486 | A1 * | 9/2016 | Mitra .................... | G07F 7/0846 |
| 2020/0019828 | A1 * | 1/2020 | Mossoba ................ | G06K 19/00 |
| 2021/0103900 | A1 | 4/2021 | Iyer et al. | |
| 2021/0174159 | A1 | 6/2021 | Finn | |

(Continued)

FOREIGN PATENT DOCUMENTS

| | | |
|---|---|---|
| CA | 2716892 A1 | 9/2009 |
| DE | 10 2008 011 299 A1 | 9/2009 |

(Continued)

*Primary Examiner* — Allyson N Trail
(74) *Attorney, Agent, or Firm* — Polsinelli PC

(57) ABSTRACT

Technology is described for providing and using a thermo-sensitive payment card. An example payment card comprises a card substrate and a personalization layer overlaying the card substrate. The personalization layer includes a first region and a second region surrounding the first region. The first region includes an account number associated with an account of a user, and the account of the user is maintained by a payment service system that issues the payment card. At least one of the first region or the second region comprises a thermochromic ink such that application of heat to the first region or the second region having the thermochromic ink causes a change in color of the personalization layer so as to reveal the account number.

20 Claims, 12 Drawing Sheets

(56)                    References Cited

U.S. PATENT DOCUMENTS

| | | | |
|---|---|---|---|
| 2022/0147974 A1* | 5/2022 | Law | G06F 21/34 |
| 2023/0004772 A1 | 1/2023 | Fletcher et al. | |

FOREIGN PATENT DOCUMENTS

| | | |
|---|---|---|
| DE | 102010054053 A1 | 6/2012 |
| DE | 102014017535 A1 | 6/2016 |
| WO | 2015/055506 A1 | 4/2015 |
| WO | 2023/278749 A1 | 1/2023 |

* cited by examiner

Mobile Device and Payment Application 200

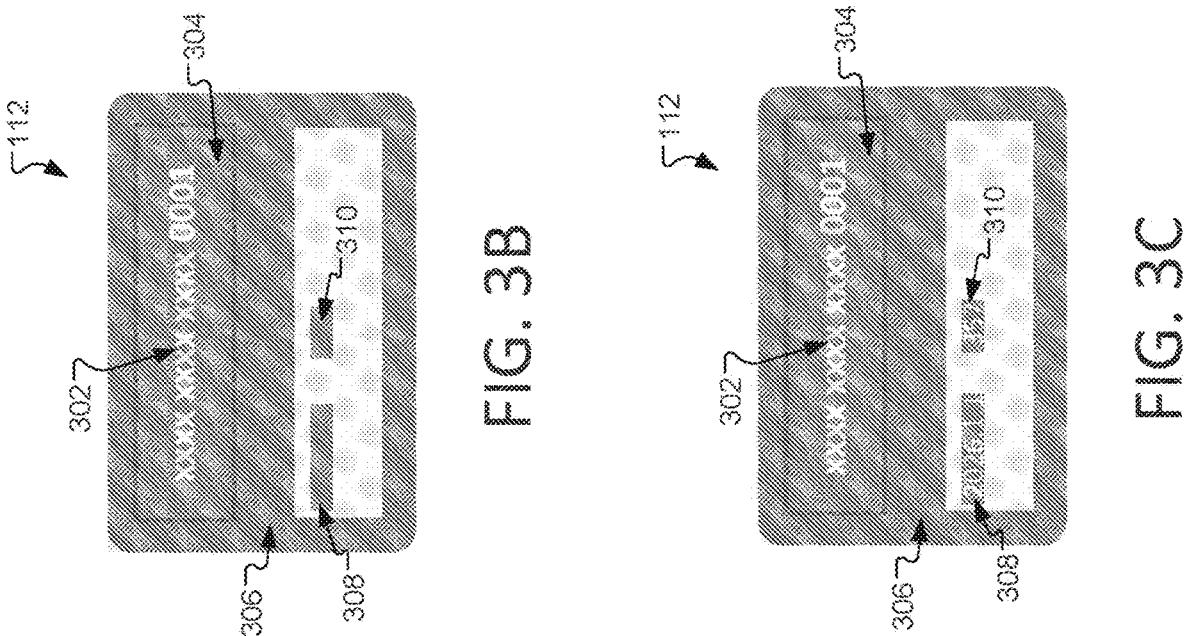
FIG. 3B
FIG. 3C
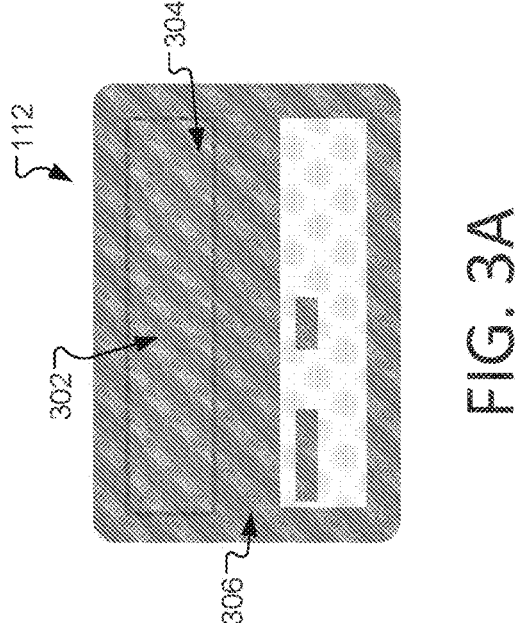
FIG. 3A

Using a payment card having a
thermochromic ink  500

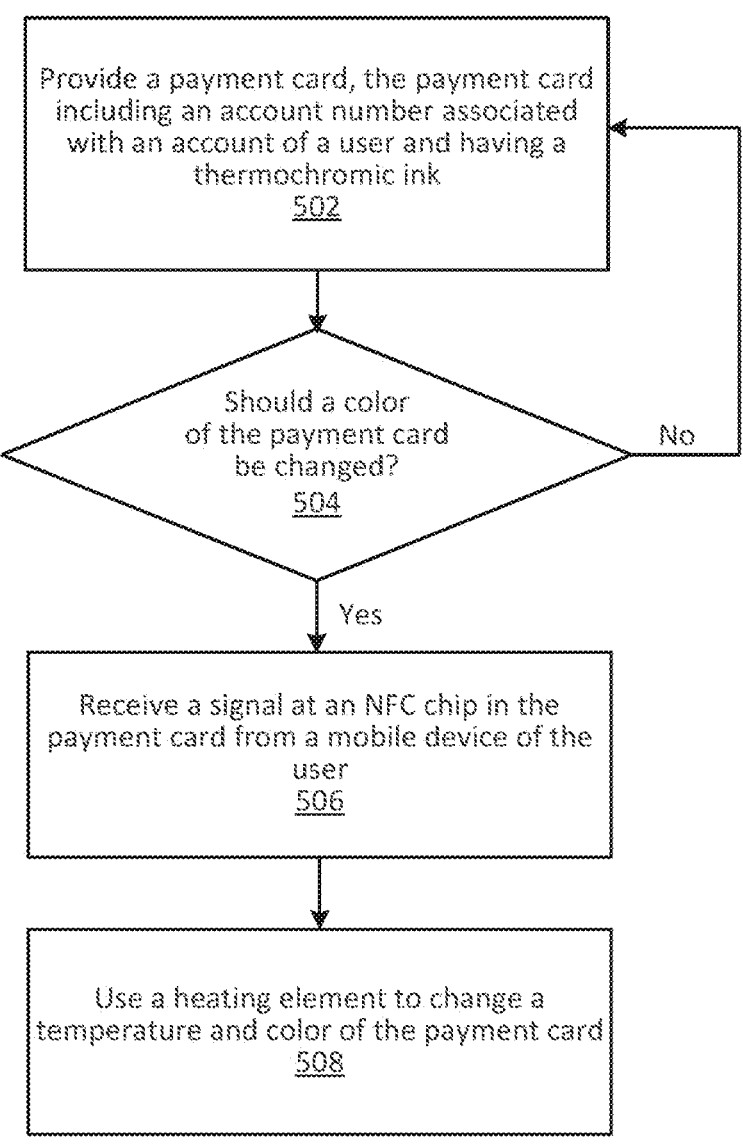

Provide a payment card, the payment card
including an account number associated
with an account of a user and having a
thermochromic ink
502

Should a color
of the payment card
be changed?
504

No

Yes

Receive a signal at an NFC chip in the
payment card from a mobile device of the
user
506

Use a heating element to change a
temperature and color of the payment card
508

FIG. 5

Chameleon card 600

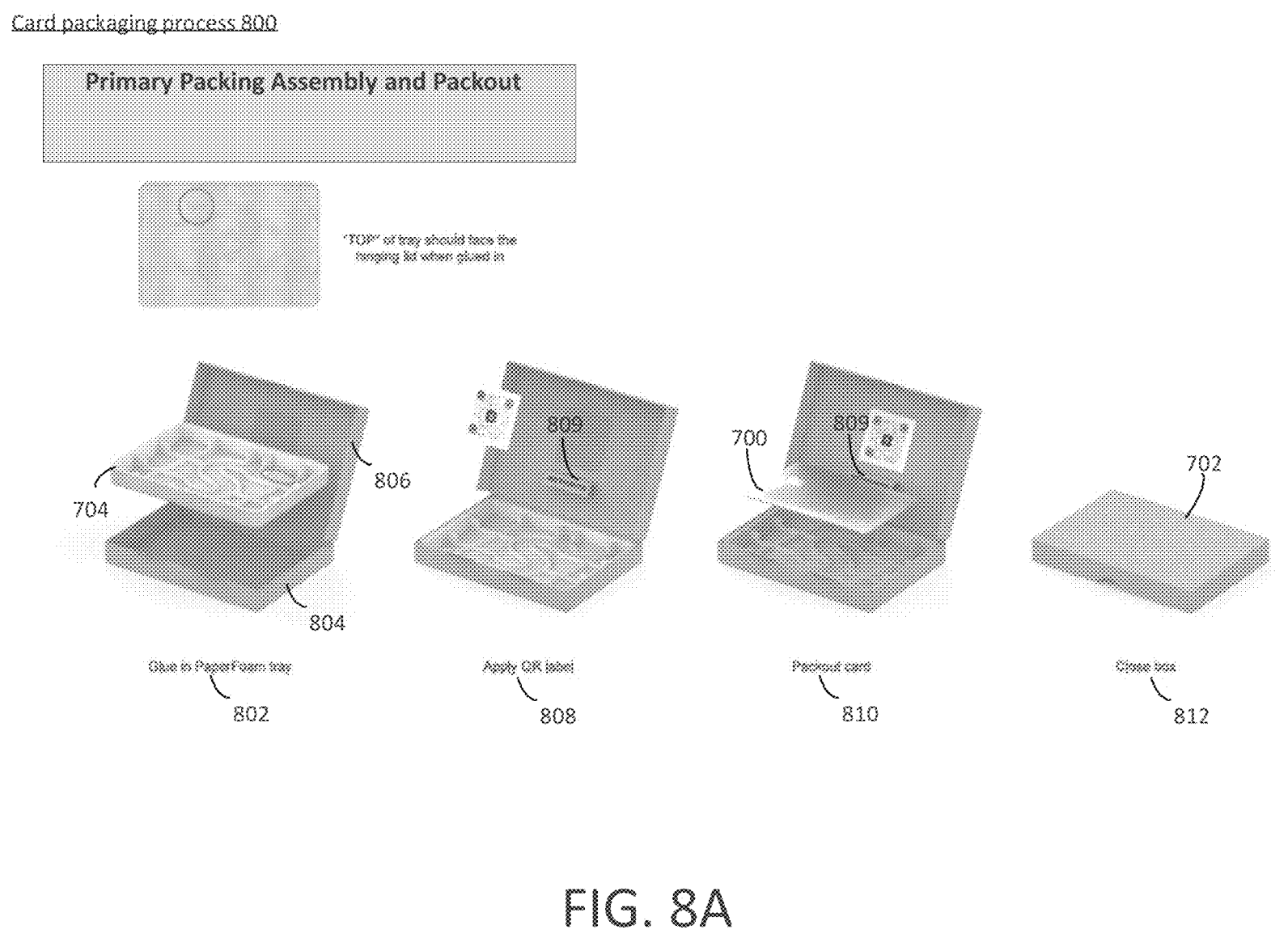

Card packaging process 800

Primary Packing Assembly and Packout

"TOP" of tray should face the stepping lid where glued in

702

Close box
812

809

700

Prec/Card card
810

805

Apply QR label
808

806

804

704

Glue in Paper/Foam tray
802

FIG. 8A

Mailer Packout

702

Slide box into studio
814

Scanner is confirm and detect in system
816

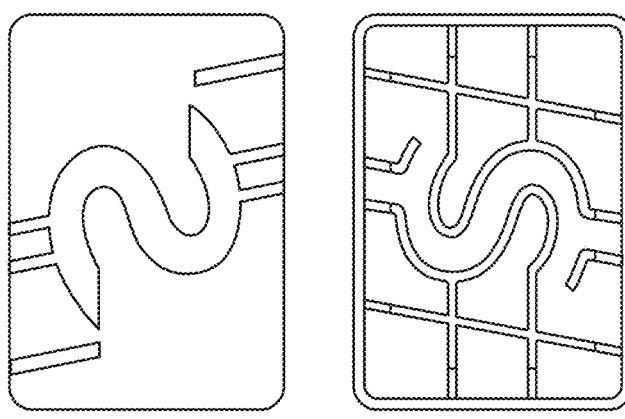
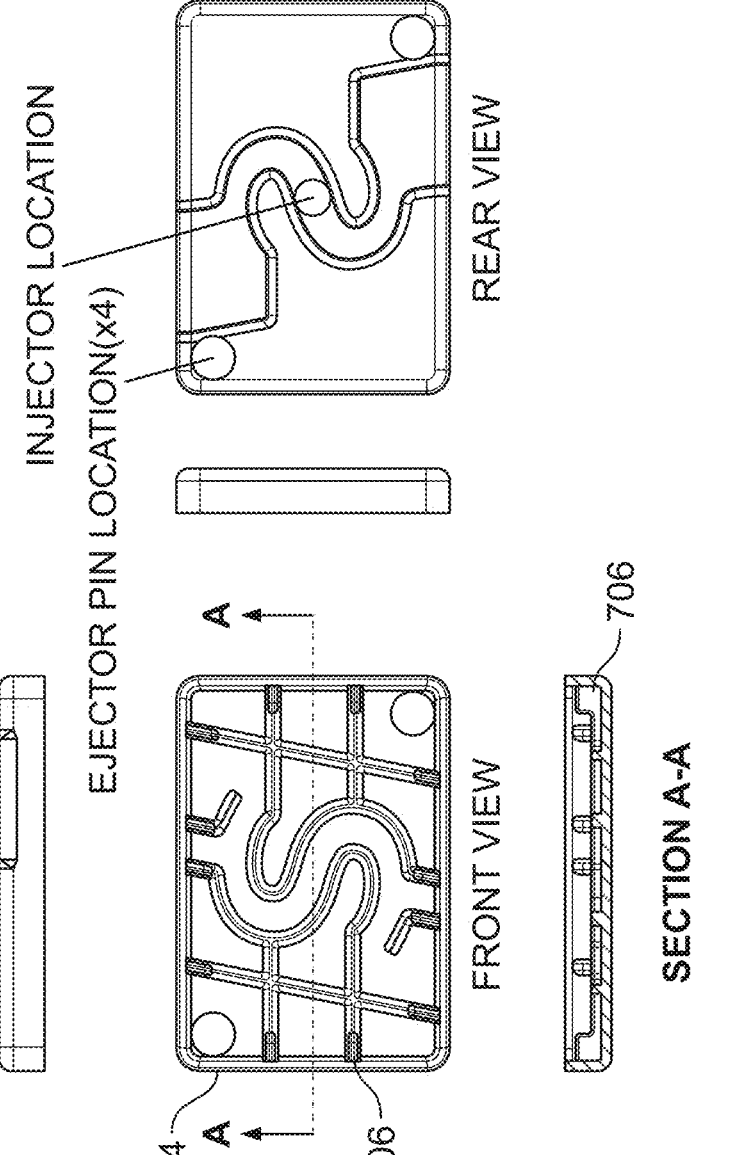
INJECTOR LOCATION
EJECTOR PIN LOCATION(x4)
REAR VIEW
FRONT VIEW
SECTION A-A
FIG. 9A
704
706
706

THERMO-SENSITIVE PAYMENT CARD

RELATED APPLICATION

This application is a continuation of and claims priority to U.S. patent application Ser. No. 17/840,438, filed on Jun. 14, 2022, which is a continuation of and claims priority to U.S. patent application Ser. No. 17/367,041, filed on Jul. 2, 2021, now U.S. Pat. No. 11,416,727, issued Aug. 16, 2022. The disclosures of these applications are incorporated by reference herein in their entirety.

TECHNICAL FIELD

People are becoming increasingly dependent on payment cards (e.g., credit cards, debit cards) to make purchases and other transactions. A good payment card is convenient and secure. Basic security features of a payment card include a unique account number, signature panel, expiration date, magnetic stripe, security code, etc.

BRIEF DESCRIPTION OF THE DRAWINGS

The advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 3A is a graphic representation of a thermo-sensitive payment card at room temperature, in accordance with certain examples;

FIGS. 3B-3E are graphic representations of a payment card upon application of heat, in accordance with certain examples;

FIG. 5 is a flowchart of a method of using a payment card, in accordance with certain examples;

FIG. 8A includes a series of images illustrating a packing assembly for a payment card, in accordance with certain examples;

FIG. 9A includes top, bottom, front, section, and side views of a holding tray for a payment card, in accordance with certain examples;

DETAILED DESCRIPTION

Figure 1:
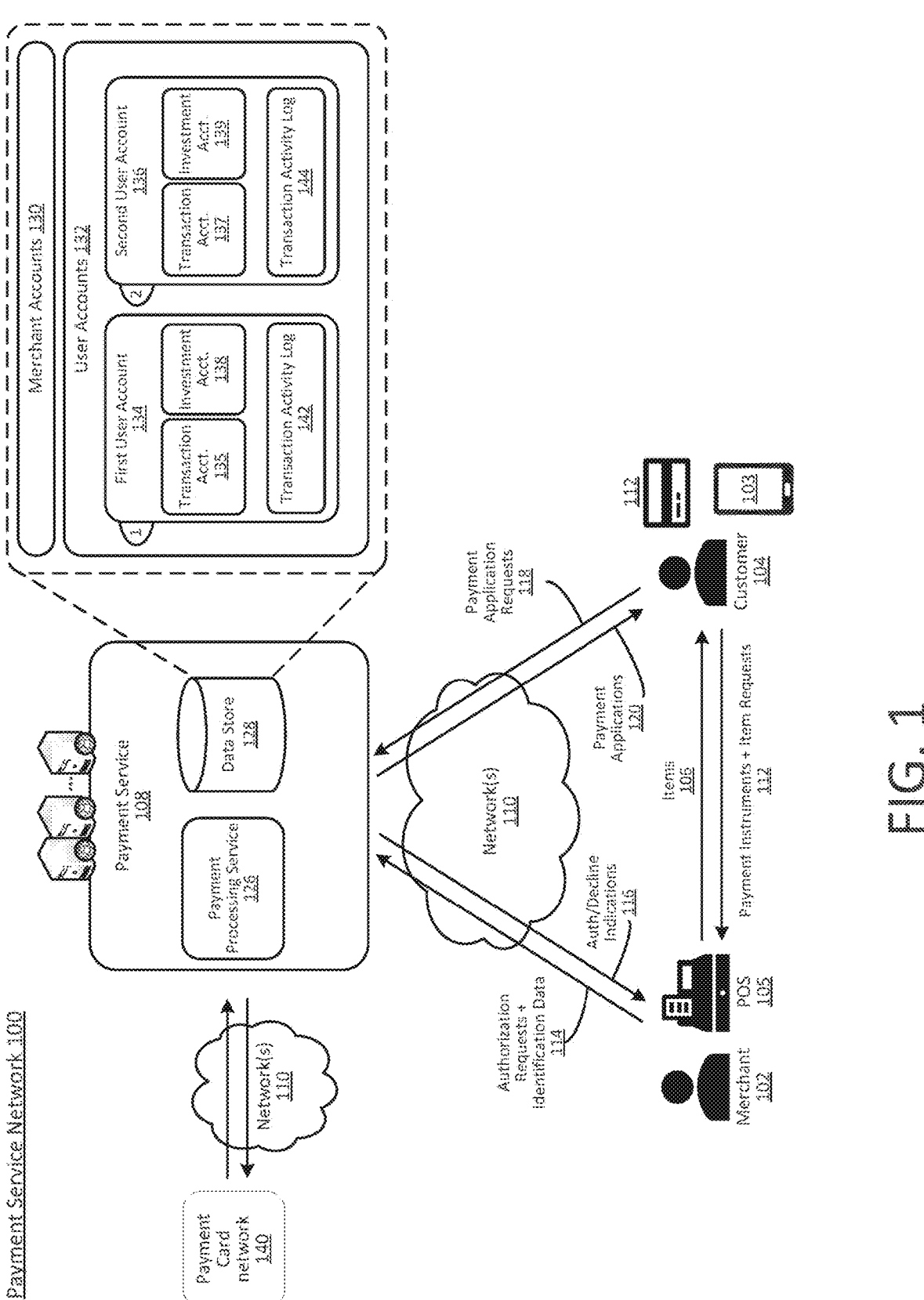
FIG. 1 illustrates a payment service network according to one example as described herein.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Basic security features of a payment card can include a unique account number, signature panel, expiration date, magnetic stripe, security code, etc. Some payment cards also include a user photo or use a virtual card number or a temporary purchase number as additional security features. Despite all these security features, however, use of a payment card is still not entirely secure, with exposure of the account number printed on the payment card being one of the greatest security vulnerabilities.

There is a need for improved methods for providing and using a payment card. In one example, a payment card comprises a card substrate and a personalization layer overlaying the card substrate. The personalization layer comprises at least a first region and a second region. The first region includes an account number associated with an account of a user, and the account of the user is maintained by a payment service system that issues the payment card. At least one of the first region or the second region includes a thermochromic ink. The thermochromic ink is an ink that changes color when a temperature increases or decreases. When heat is applied to the first region or the second region of the payment card having the thermochromic ink (e.g., when the user touches the first or second region), a color of the thermochromic ink in the first and/or second region may change. As a result, the account number can be revealed. In some examples, the first region and the second region are substantially identical in color at room temperature such that the account number included in the first region is invisible at room temperature.

Additionally or alternatively, in some examples, the payment card includes a heating element coupled to a near field communication (NFC) chip embedded in the payment card. The heating element can cause a temperature of the payment card to change in response to a signal received from the NFC chip, and the NFC chip can send the signal in response to an interaction of the user with a mobile application executing on a device of the user. Thus, the temperature and the color of the payment card can be controlled by a user interaction on the device of the user (e.g., a mobile phone) and/or through a physical touching of the payment card by the user.

Further, in some examples, a temperature reading of the payment card can be determined (e.g., based on the color of the payment card) and then used to identify a location of the payment card. The location of the payment card during a transaction helps validate the transaction, for example, by confirming that the color of the card is consistent with the temperature in an expected location of the card. Also, biometric information of the user using the payment card can be obtained to control the temperature adjustment of the payment card by the heating element and to further control whether to reveal or conceal information embedded on the card (e.g., the account number of the payment card), or information shown with a graphical display area of the payment card.

Advantageously, the technology described herein solves an information exposure problem of payment cards. Currently, an account number of a payment card can be easily exposed to strangers, either by unintentional exposure (e.g., the account number is accidentally captured by a photo shared in social networks) or by intentional interception (e.g., the number is remembered and stolen by a person seeing the card). The present technology embeds a security feature where the account number is obfuscated at or around room temperature and is revealed only when the temperature is changed, for example, when a user touches the card or the card is heated with the heating element. This can prevent the account number or other card information from being exposed to people who have a view of the card.

Further, the present technology embeds additional layers of security features, such as preventing fraudulent transactions based on location detection using the temperature and color of the payment card, preventing information exposure of the payment card from physical touch of unauthorized users, etc. In general, using the thermo-sensitive payment card in a payment service platform as described herein reduces network congestion (e.g., by reducing the degree of fraudulent transactions) and improves privacy, security, and accuracy associated with handling and using the payment card.

The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "may," "can," "could," or "might" be included or have a characteristic, that particular component or feature is not required to be included or have the characteristic.

The term "module" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs.

In various examples, "room temperature" can be about 20° C. (68° F.), can range from about 20° C. to about 22° C. (72° F.), can range from about 20° C. to about 25° C. (77° F.), or can range from about 15° C. (59° F.) to about 30° C. (86° F.).

In various examples, "substantially identical in color," "substantially similar colors," and similar phrases can refer to a color difference (e.g., between two adjacent colors) that is visibly indistinguishable or not perceptible by the human eye (e.g., Delta E<1), only perceptible under close scrutiny (e.g., 1≤Delta E≤2), slightly perceptible (e.g., 2≤Delta E≤10), or perceptibly different but still appear similar (e.g., 11≤Delta E≤49), where "Delta E" is a value representing a "distance" between two colors (e.g., in L*a*b* color space).

The preceding summary is provided for the purposes of summarizing some examples to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

FIG. 1 illustrates a payment service network 100 in accordance with one example embodiment. According to one example, payment service network 100 includes merchant 102 that conducts transactions with customer 104 (or user 104) for items 106 (e.g., goods or services) offered by the merchant 102. The payment service network 100 includes a payment service system 108 (also referred to as "payment service" or "PSS") coupled to a merchant point of sale (POS) device 105 and customer device 103 via a network 110, to authorize payment instruments of customer 104. Customer 104 may engage in transactions with merchant 102 to obtain items 106. Customer 104 may provide, as shown at 112, payment instruments to merchant 102 along with requests for items 106 offered by merchant 102.

In various examples, the payment service system 108 can be or include an online platform for processing payments 126 as described herein. The payment service system 108 or online platform can utilize or include one or more server computers, which can be referred to herein as platform servers or payment servers.

Merchant 102 may utilize POS device 105 for accepting payment from customer 104. POS device 105 may be any mobile or non-mobile device that includes instances of a POS application that executes on the POS device 105. The instances of the POS application may be or include a downloadable application provided by the payment service system 108, or embedded software running on an all-in-one POS device provided by the payment service system 108. POS device 105 may further include a wireless communication module with wireless communication capabilities (e.g., NFC, Bluetooth, cellular data, etc.), allowing wireless communication between POS device 105 and other devices with wireless communication capabilities. For example, POS device 105 may have an NFC-enabled chip that communicates with other NFC-enabled devices. The POS application may be provided by the payment service 108 and provide POS functionality to POS device 105 to enable merchant 102 (e.g., a business or owners, employees, or agents of the business) to accept payments from customer 104. In some types of businesses, POS device 105 may correspond to a store, restaurant, website, or other place of business of the merchant, and thus, may be a fixed location that typically does not change on a day-to-day basis, or may correspond to an Internet commerce site. In other types of businesses, however, the location of POS device 105 may change from time to time, such when the merchant operates a food truck, is a street vendor, is a cab driver, etc., or has an otherwise mobile business, e.g., in the case of a merchant who sells goods or services at buyers' homes, places of business, and so forth.

As used herein, a merchant may include any business engaged in the offering of goods or services for acquisition by customers. Actions attributed to a merchant may include actions performed by owners, employees, website servers, or other agents of the merchant, and thus no distinction is made herein unless specifically discussed. In addition, as used herein, the customer 104 may include any entity that acquires goods or services from a merchant, such as by purchasing, renting, leasing, borrowing, licensing, or the like. Hereinafter, goods and/or services offered by merchants may be referred to as items, e.g., item 106. Thus, a merchant and a customer may interact with each other to conduct a transaction in which the customer acquires item 106 from merchant 102, and in return, customer 104 provides payment 112 to merchant 102.

As used herein, a transaction may include a financial transaction conducted between customer 104 and merchant 102. For example, when paying for a transaction, customer 104 can provide the amount that is due to the merchant using cash or other payment instrument 112 (e.g., a debit card, a credit card, a stored-value gift card, a check, through an electronic payment application on device 103 carried by the customer, or the like). The merchant can interact with POS device 105 to process the transactions, such as by inputting (e.g., manually, via a magnetic card reader, NFC reader, or an RFID reader, etc.) identifiers associated with payment instrument 112. For example, a payment instrument of the customer may include a card having one or more magnetic strips for providing card and customer information when swiped in a card reader. In other examples, other types of payment instruments may be used, such as smart cards having a built-in memory chip that is read by the device when the card is inserted into the reader, such as chips that comply with the Europay, MasterCard, and/or Visa (EMV) standard (e.g., EMV cards). In other examples, other types of payment instruments include cards or computing devices that communicate via radiofrequencies such as radio frequency identification (RFID) tags, near field communication (NFC) devices, etc.

During the transaction, POS device 105 can determine transaction information describing the transaction, such as an identifier of the payment instrument (e.g., payment card number, account credentials, or other payment device identifier), an amount of payment received from the customer, the item(s) acquired by the customer, a time, location (e.g., street address, GPS coordinates, IP address, etc.) and date of the transaction, a payment card network 140 associated with the payment instrument, an issuing bank of the payment instrument, a name or user account of the customer, contact information of the customer, type of currency, IP address of POS device 105, IP address of customer device 103, and so forth. POS device 105 can send the transaction information to payment service 108 over network 110 (e.g., including the Internet), either substantially contemporaneously with the conducting of the transaction (in the case of online transactions) or later when POS device 105 is in the online mode (in the case offline transactions).

In an offline transaction, POS device 105 may store information related to the transaction, including, but not limited to, a cost of the transaction, a time of day at which the transaction occurred, a day of the week at which the transaction occurred, a location at which the transaction took place, an item that the customer obtained, an identity and/or contact information of the customer, and a payment instrument used in the transaction. After conducting an offline transaction with customer 104, POS device 105 may provide at least a subset of the stored information to the payment service 108 over the network 110. The network 110 may represent or include any one or more wired or wireless networks, such as a Wi-Fi network, a cellular network, the Internet, or the like. In an online transaction, POS device 105 may send this information to payment service 108 over network 110 substantially contemporaneously with the transaction with the customer 104.

After merchant 102 receives the payment information from customer 104, merchant 102 may send respective authorization requests, along with information related to the respective transactions, to payment service 108, as illustrated at 114. Payment service 108 may include payment processing service 126 and data store 128 that stores merchant accounts 130 and user accounts 132, as well as the transaction histories of merchants and users.

The payment processing service 126 may function to receive the information regarding a transaction from POS device 105 of merchant 102 and attempt to authorize the payment instrument 112 used to conduct the transaction. Payment processing service 126 may then send an indication of whether the payment instrument has been approved or declined back to POS device 105, as illustrated at 116.

Generally, when a customer 104 and a merchant 102 enter into an electronic payment transaction, the transaction is processed by electronically transferring funds from a financial account associated with the customer 104 to a financial account associated with the merchant 102. As such, the payment processing service 126 may communicate with one or more computing devices of a payment card network 140 (e.g., MasterCard® or VISA®) over network(s) 110 to conduct financial transactions electronically. Payment processing service 126 can also communicate with one or more computing devices of one or more banks, processing/acquiring services, or the like over the network 110. For example, payment processing service 126 may communicate with an acquiring bank, an issuing bank, and/or a bank maintaining user accounts for electronic payments. Payment processing service 126 may also communicate with, or access user and merchant accounts maintained by payment service 108. In some examples, the payment processing service 126 can communicate with one or more entities that perform or manage securities transactions and/or cryptocurrency transactions.

An acquiring bank may be a registered member of a card association (e.g., Visa® or MasterCard®) and/or may be part of a payment card network 140. An issuing bank may issue credit cards to buyers (e.g., customer 104) and may pay acquiring banks for purchases made by cardholders (e.g., customer 104) to which the issuing bank has issued a payment card. Accordingly, in some examples, the computing device(s) of an acquiring bank may be included in the payment card network and may communicate with the computing devices of a card-issuing bank to obtain payment. Further, in some examples, the customer 104 may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

While FIG. 1 illustrates merchants 102 sending the transaction data directly to the payment service 108 as part of the request to authorize the payment instrument 112, in some instances other entities (e.g., banks associated with the merchant 102 or with customer payment instruments 112) may provide transaction data, such as part of a batched, periodic process.

According to one example, data store 128 may be used to store merchant accounts 130 and user accounts 132, among other data. User accounts 132 may store records of user accounts associated with each user of payment service 108. For example, user accounts 132 may include a first user account 134 and a second user account 136. Each of the accounts of user accounts 132 may include information related to the respective balance and transaction history associated with each user account. Each of the user accounts 132 may include one or more balances associated with a payment service and further include access to external bank accounts. For example, first user account 134 includes transaction account 135 and investment account 138, and second user account 136 includes transaction account 137 and investment account 139. According to one example, transaction accounts 135 and 137 may include stored balances maintained by payment service 108 on behalf of its users. Investment accounts 138 and 139 may be used by users to save a stored balance towards a particular goal or otherwise to allow payment service 108 to maintain an investment on behalf of its users. Each user account 134 and 136 of user accounts 132 may also include a loan account representing funds that are loaned to the user by the payment service 108. Each user account 134 and 136 of user accounts 132 may further include access to external payment card networks (e.g., payment card network 140) to facilitate transactions with credit cards, debit cards, and the like.

Furthermore, transaction history for each user account may be stored using an individual log for each user account. For example, first user account 134 includes transaction activity log 142 and second user account 136 includes transaction activity log 144. Transaction activity logs 142 and 144 may be used to store transaction history for each respective user account, including debits and credits made to the balances thereof. Similarly, transaction history for merchants may be stored in merchant accounts 130 using an individual log for each merchant.

According to one example, each of the user accounts 132 may include stored values of multiple currencies, such as fiat currency, cryptocurrency, equity value, or other monetary value represented by digital assets. Each of the currencies may be stored directly in each account of user accounts 132. Each of the user accounts 132 may further include access to external accounts that facilitate such currencies (e.g., third party cryptocurrency exchanges/wallets, equity holding accounts, etc.).

According to one example, merchant accounts 130 may store information associated with respective ones of the merchants 102. For instance, the merchant accounts 130 may indicate a class of items offered by respective merchants (e.g., coffee items, collectibles, apparel, etc.), a type of business of the merchant (e.g., restaurant, coffee shop, retail store, etc.), a geographical location of the merchant, and the like.

In some instances, a computing device associated with the merchant (e.g., POS device 105, servers of the merchant, etc.) determines when the customer visits physical premises or a digital presence of the merchant. For instance, the device 103 of the customer 104 may include an application (e.g., an application provided by payment service 108) that communicates with POS device 105 of merchant 102 via near-field communication protocols (e.g., NFC, Bluetooth, etc.). Therefore, when the customer visits the physical premises of merchant 102, for example, POS device 105 may detect the presence of customer device 103. The POS device 105 may accordingly determine that the customer 104 is present. In another example, one or both of POS device 105 and customer device 103 may share its location (e.g., GPS coordinates) to a common service for determining when customer device 103 and POS device 105 are located within a proximity threshold of one another, and for mediating a transaction between customer device 103 and POS device 105.

In another example, customer 104 may utilize customer device 103 to check in at the merchant location, and POS device 105 may receive an indication of this check in. When the customer visits a digital presence of merchant 102 (e.g., mobile app, website, etc.), customer 104 may log in or otherwise provide information (e.g., a cookie on the device 103) from which the merchant 102 determines that the customer 104 is at the merchant location. Of course, while a few examples are listed, it is to be appreciated that the merchant 102 and/or payment service 108 may determine when the customer 104 is present at the merchant location in any other number of ways. In each instance, after payment service 108 receives an indication that customer 104 is co-located with merchant 102, the payment service 108 may determine whether to send one or more previously expressed item preferences of the customer 104 to the merchant 102.

In addition, customer 104 may desire to receive an instance of a payments application, such as a mobile wallet application, from the payment service 108. FIG. 1 illustrates that the customer 104 may send payment-application requests 118 to payment service 108. In response, payment service 108 may provide instances of the application 120 back to customer device 103. In addition, payment service 108 may map an identification of the instance of the application 120 to the user accounts 132.

Figure 2:
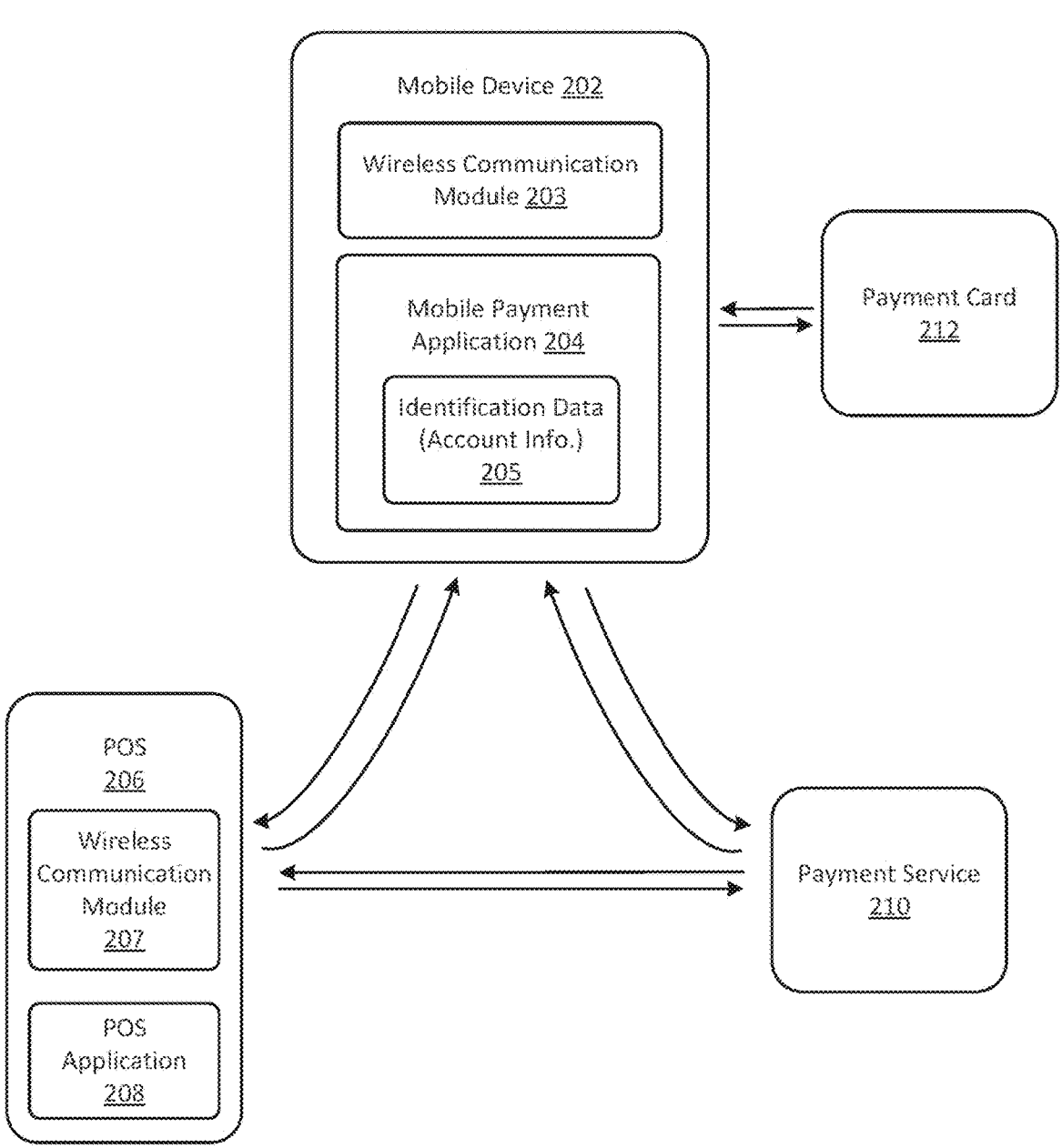
FIG. 2 illustrates a mobile device and payment application according to one example as described herein.

FIG. 2 illustrates a mobile device and payment application 200 in accordance with one example embodiment. Mobile device 202 and POS device 206 may be computing devices with wireless communication modules 203 and 207, respectively, with wireless communication capabilities (e.g., NFC, Bluetooth, cellular data, etc.), allowing wireless communication therebetween. A payment application 204 is a payment application provided by the payment service 210 and executes on a user's mobile device 202. POS device 206 can include a Point of Sale (POS) application 208 that is associated with one or more merchant systems and can be used by the customer to purchase products or services. The payment application 204 and POS application 208 can also be a website provided by payment service 210 (e.g., payment service 108), or any source website or application that provides a portal to send and accept payments for transactions using payment service 210. Applications 204 and 208 may be accessible through a web browser (e.g., Chrome® or Safari®) on the mobile device 202, according to one example. In another example, applications 204 and 208 can be software applications downloadable via an application store (e.g., Google Play Store®, Apple App Store®, etc.). Once accessed or registered into the applications 204 and 208, the web browser or application may remember the credentials (e.g., identification data 205) for subsequent visits (for example, through web browser authentication, web cookies, web history, etc.), allowing access to the applications without logging-in to an account again. The description herein is with reference to the payment application 204 and POS application 208 as installed applications; however, it will be understood that these applications as authenticated or unauthenticated applications on a web browser is within the meaning of the term. In various examples, the mobile device 202, the POS device 206, and/or the payment service 210 can be the same as or can include the customer device 103, the POS device 105, and/or the payment service 108, respectively.

Payment application 204 can include an electronic wallet application, money transfer application (e.g., application for sending and receiving money via email or phone), or any other application having stored therein identification data 205 linked to user accounts of payment service 210 or other data linked to one or more payment cards and/or bank accounts, both of which may be used by the owner of the mobile device to initiate transactions. Such transactions can include traditional purchase transactions between customers and merchants or service providers, person-to-person transactions, and the like.

Payment application 204 can also be used to manage internal payment cards (i.e., virtual payment cards issued by payment service 108 to users having a user account 132). As such, options with respect to internal payment cards can be adjusted and managed using payment application 204. For example, when a user account of user accounts 132 includes multiple payment methods (e.g., credit card, bank account, loan account, etc.), payment application 204 can set one of those payment methods to be the default method for debits or credits when using an internal payment card. In one example, the color of the virtual card as displayed with the mobile application may change dynamically to match the current color of the physical thermo-sensitive payment card. For example, the mobile payment application 204 may communicate with a physical payment card 212 using Bluetooth, NFC, or other wireless communication protocol via onboard electronics embedded within a structure of the payment card 212.

Collectively, all tools for offering payment are herein referred to as payment instruments. For example, payment instruments can refer to mobile device 202 running payment application 204, internal payment cards, external payment cards, NFC-enabled payment cards, etc. The use of the term payment instrument does not imply a mechanism of use. For example, mobile device 202 may be utilized via NFC protocols (e.g., NFC Data Exchange Format (NDEF), NFC tags, etc.), or via use of software on mobile device 202 to send messages through web forms, applications, APIs, or messaging applications. As an additional example, payment cards, whether internal (e.g., virtual cards) or external (e.g., physical cards), can be presented to a merchant to be read, or a card number can be entered into a terminal under the control of the merchant or under the control of the customer. A payment instrument can include multiple payment instruments, such as when utilizing mobile device 202 to enter a payment card number. Throughout this description, specific payment instruments may be discussed, however, the specific payment instruments should not be considered limiting, and persons of ordinary skill in the art will appreciate instances in which a payment instrument such as a payment card can be substituted for another payment instrument such as a mobile device, and vice versa.

Thermochromic Payment Card

The customer 104 (or user 104) makes payment to a merchant 102 through a payment instrument 112 when conducting a transaction for acquiring item(s) 106 (e.g., goods or service) from the merchant 102, as illustrated in FIG. 1. The payment instrument can be a payment card 112 such as a credit card, a debit card, a gift card, or the like. In certain examples, the payment card 112 can be a thermochromic payment card that includes a thermochromic ink in one or more regions of the payment card. The thermochromic ink can be or include an ink, coating, material, and/or pigment that changes color when temperatures increase or decrease. For example, when heat is applied to a region of the payment card 112 having the thermochromic ink (e.g., by the user 104 touching or pressing finger(s) on the region and transferring body heat to the card 112), the color of the thermochromic ink and the region having the thermochromic ink can change. If the region stores any information (e.g., through a printed pattern of the thermochromic ink), the color change of the thermochromic ink can affect the visibility of the stored information. Thus, by controlling and/or adjusting a temperature of the thermochromic ink on the payment card 112, there exists a feasible and efficient way to control and secure the display of the information stored in the payment card 112, such as an account number of the payment card 112. An example payment card 112 and associated packaging materials and methods are depicted in FIGS. 6-9C and described below.

FIG. 3A is a graphic representation of a top or bottom surface of a payment card 112 at room temperature, in accordance with certain examples. The payment card 112 includes at least a first region 302 and a second region 304. The first region 302 can include or correspond to an account number associated with an account of a user. The account of the user can be maintained by a payment service system (e.g., payment service system 108) that issues the payment card 112. The second region 304 can include or correspond to certain background portions of the payment card 112, such as regions around or adjacent to characters of the account number. In some examples, the second region 304 can surround the first region 302 and/or be immediately adjacent to one another. In other examples, the first region 302 and the second region 304 can be separated and/or not adjacent to one another.

In certain examples, the first region 302 and the second region 304 of the payment card 112 are designed to be substantially identical in color at room temperature. Since different thermochromic inks can have different colors at different temperatures, a type of thermochromic ink is chosen to ensure the first region 302 and the second region 304 are substantially identical color at room temperature. The purpose of such design is to provide a security feature for hiding certain information of the payment card 112 when the payment card 112 is left exposed and untouched at an ambient or room temperature, thereby avoiding unnecessary or inadvertent information exposure. For example, in FIG. 3A, the first region 302 and the second region 304 are of similar color (e.g., at room temperature) such that the account number in the first region 302 is hidden in the background and/or not visible. When the temperature of the first region 302 or the second region 304 changes, the colors of the two regions can become differentiated so as to reveal the account number in the first region 302. In other words, the account number can be obfuscated unless, for example, a user touches the card 112 or heat is otherwise applied to the card 112. The body heat of the user's finger(s) can cause the color of the first region 302 or the second region 304 to change so that the account number stands out or is perceptible.

Figure 3E:
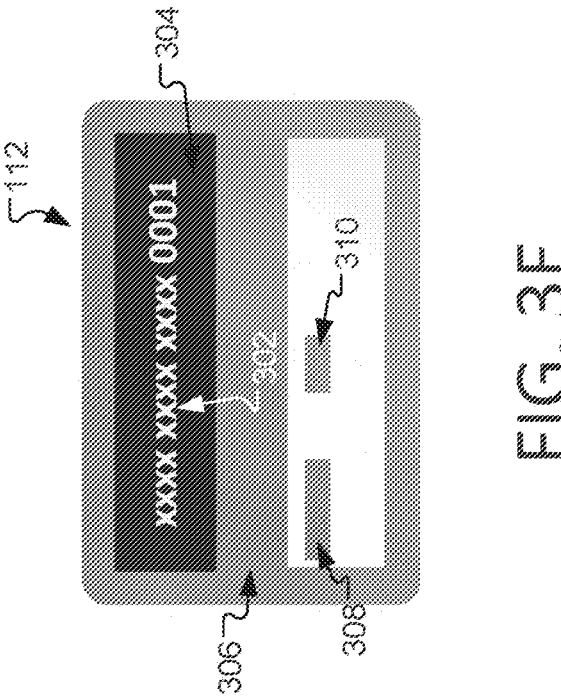
Figure 3D:
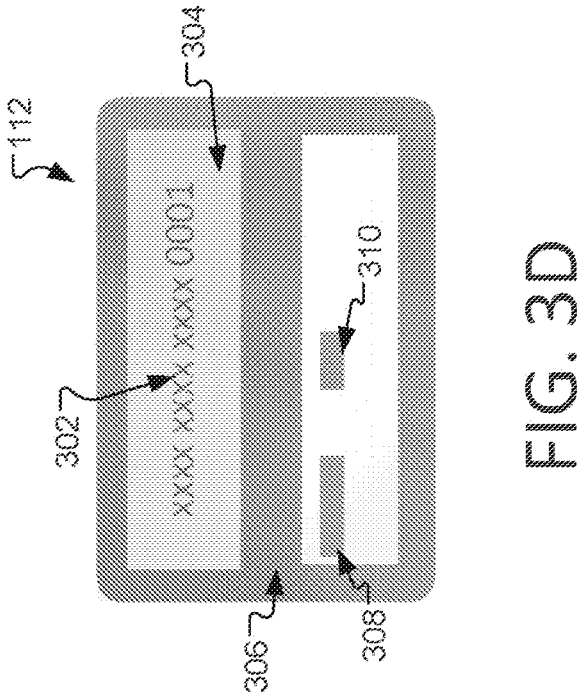

FIGS. 3B-3D are graphic representations of the payment card 112 upon application of heat, in accordance with certain examples. In some examples, the first region 302 includes the thermochromic ink and the second region 304 does not include the thermochromic ink. Alternatively or additionally, the thermochromic ink can be included in the second region 304 but not in the first region 302, or both regions 302 and 304 can include a thermochromic ink (e.g., a different thermochromic ink in each region). In some examples, the first region 302 is a region containing private or sensitive information of the payment card 112. In addition to or instead of including the account number of the payment card 112, the first region 302 can include a subregion 308 of expiration date information, a subregion 310 of card verification value (CVV) information, and/or other subregion(s) of other account data (not shown). When a user 104 touches the payment card 112, body heat from the user can change the temperature of a thermochromic ink in the card 112, which can cause the color of the thermochromic ink to change.

FIG. 3B illustrates an example in which the account number in the first region 302 includes a thermochromic ink and other regions of the card 112, including the second region 304 and a background region 306, do not include a thermochromic ink. Compared to FIG. 3A, the application of heat has caused the color of the account number in the first region 302 to change and become visible relative to colors in the second region 304 and the background region 306, which do not include a thermochromic ink and have not changed color. In the example of FIG. 3B, the expiration date in the subregion 308 of the first region 302 and the CVV in the subregion 310 of the first region 302 may not include the thermochromic ink and/or heat may not have been applied to these subregions, such that the color of the expiration date and the CVV has not changed to reveal the expiration date and CVV information. While FIG. 3B indicates that the color of the first region 302 can become lighter upon application of heat, it is understood that the thermochromic inks described herein can become darker and/or change hue upon application of heat, in various examples.

FIG. 3C illustrates an example in which the account number, the expiration date and the CVV in the first region 302 include a thermochromic ink and other regions of the card 112, including the second region 304 and the background region 306, do not include a thermochromic ink. Compared to FIG. 3B, responsive to the application of heat, not only has the account number become visible, but the expiration date in the subregion 308 and the CVV in the subregion 310 have also become visible.

FIG. 3D illustrates an example in which the second region 304 includes a thermochromic ink and the first region 302 and the background region 306 do not include a thermochromic ink. Compared to FIG. 3A, the application of heat has caused the color of the second region 304 to change relative to colors in the first region 302 and the background region 306, which do not include a thermochromic ink and have not changed color. Because the second region 304 immediately surrounds the first region 302 in this example, the color change in the second region 304 renders the account number in the first region 302 visible.

FIG. 3E illustrates an example in which the first region 302 and the second region 304 each includes a different thermochromic ink and the background region 306 does not include a thermochromic ink. Compared to FIG. 3A, the application of heat has caused the color of the first region 302 to become lighter and the color of the second region 304 to become darker, such that the account number in the first region 302 is visible. The color in the background section 306 has not changed in this example.

A secure information exposure mechanism is therefore established based on a security feature of using a type of thermochromic ink that allows an account number or other information on a payment card to be (i) invisible when the card is not in use or is at or near room temperature and (ii) visible when the card is in use, held by a user, or at a temperature above or below room temperature, as illustrated in FIGS. 3A-3D. While a physical touch of the payment card can be used to heat the card, in other examples, signals can be generated (as described below with reference to FIG. 4) to change the temperature of the thermochromic ink embedded in or on the payment card, and further to change a color of the card and render the card number or other information visible based on the color change.

Payment Card Components

Figure 4:
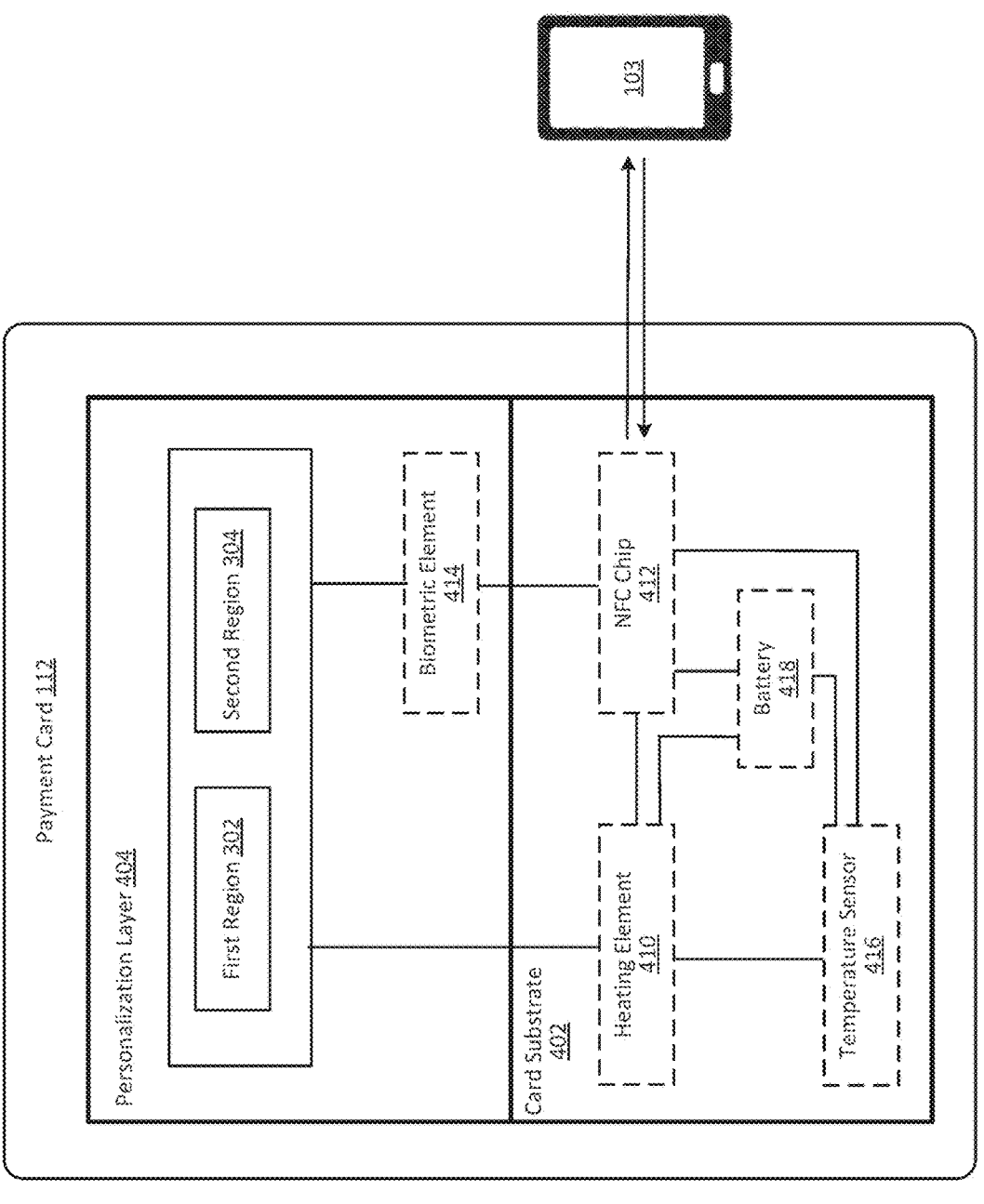
FIG. 4 is a schematic diagram of a payment card, in accordance with certain examples.
Figure 6:
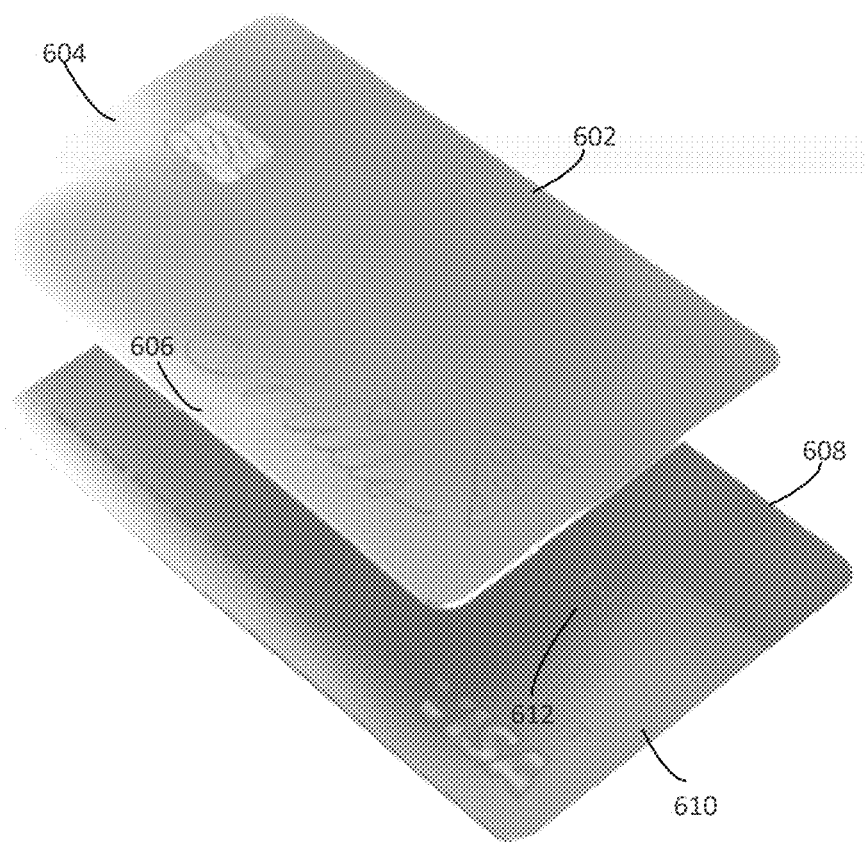
FIG. 6 is a perspective view of front and back sides of a payment card, in accordance with certain examples.

FIG. 4 illustrates a payment card 112, in accordance with certain examples. The payment card 112 can be made of multiple layers or plastic or other materials laminated together. In certain examples, the payment card 112 includes at least a card substrate 402 and a personalization layer 404. The card substrate 402 may include important card information used in conducting financial transactions and/or security features used for preventing unauthorized or fraudulent card uses. For example, the card substrate 402 may include a magnetic stripe that is encoded with binary information for identifying the card as an authentic card associated with an account of a user. In the depicted example, the card substrate 402 includes a heating element 410, a near field communication (NFC) chip 412, a temperature sensor 416, and a battery 418. The personalization layer 404 may include card information customized for the account of the user (e.g., an account number and/or the user's name) and additional security features. For example, the personalization layer 404 can include a first region 302, a second region 304, and a biometric element 414. The first region 302 can include the account number or other information associated with the account of the user. The account number or other information can be printed or coated on the personalization layer 404 and/or on an outer surface or inner layer of the card 112. The second region 304 can include one or more background portions of the payment card 112, such as regions surrounding or adjacent to the first region 302. The first region 302 and/or the second region 304 can include a thermochromic ink, as described herein. In some examples, the account number of the payment card 112 is obfuscated at or near room temperature and is revealed when a user touches the payment card 112 or when the temperature of the card is otherwise changed (e.g., in response to temperature-changing signals). The heating element 410, the NFC chip 412, the biometric element 414, the temperature sensor 416, and the battery 418 are depicted in dash-lined boxes to indicate that these components can be optional or can reside in other layers of the payment card 112. For example, additionally or alternatively, the heating element 410 can be embedded in the personalization layer 404 and/or the biometric element can be embedded in the card substrate 402, while the temperature sensor 416 can be optional.

The heating element 410 is configured to change a temperature of the payment card 112. In certain examples, the heating element 410 is coupled to the NFC chip 412 embedded in the payment card 112. The heating element 410 receives a signal from the NFC chip 412 to change the temperature of the payment card 112. The NFC chip 412 communicates with a mobile application executing on a device of the user, e.g., a mobile device 103. Based on an interaction of the user with the mobile application, the NFC chip 412 is configured to receive a signal from the mobile application and transmit a signal to the heating element 410 to cause the heating element 410 to change the temperature of the payment card 112. For example, a user can set up an alert using the mobile application executing on his/her mobile phone. When an alert event happens, e.g., a credit limit of the payment card 112 is reached or a transaction using the payment card 112 fails, the mobile application can generate a signal and transmit the signal to the heating element 410 through the NFC chip 412. Responsive to receiving the signal, the heating element 410 can heat up one or more regions of the payment card 112 having the thermochromic ink to change the color of the one or more regions. The changed color of the payment card 112 provides a visually distinctive alert that calls the user's attention.

Typically, the heating element 410 and the battery 418 work together to change a color of the payment card 112. The heating element 410 along with the battery 418, in certain examples, can be configured to perform localized heating to a specific region of the payment card 112 having a thermochromic ink to reveal a message or a card/account number. Therefore, even if another region of the payment card 112 also has the thermochromic ink, only the specific region where the temperature was increased by the heating element 410 may change color. In some examples, the heating element 410 can be configured to receive a signal specifying the color and/or temperature from the mobile application via the NFC chip 412, and to change the temperature and color of the payment card 112 according to different signals. For example, if a credit limit is reached, the heating element 410 can receive a first signal specifying a first temperature and change the color of a region of the payment card 112 to red based on the first signal. In another example, if a transaction fails due to insufficient funds, the heating element 410 can receive a second signal specifying a second temperature and change the color of a region of the payment card 112 (e.g., the same region) to purple based on the second signal. The card temperature can be chosen such that a resulting color reflects or matches an event of a specific type and/or is associated with a specific merchant. For example, when a determination is made (e.g., by the mobile application) that the payment card is in, near, or being used to make a purchase with a particular merchant, the temperature can be adjusted to achieve a color that matches a color used by the merchant (e.g., as part of trademark or trade dress used by the merchant) In various examples, the colors achievable by a thermochromic ink used in the card can be mapped to specific temperatures (e.g., using a lookup table or mathematical function). Such a mapping can be developed by measuring colors for a variety of colors. Additionally or alternatively, the heating element can perform localized heating of the card to achieve localized temperature changes that present messages to the user. Such messages can include, for example, one or more letters or numbers, a trademark or logo (e.g., for a merchant), and/or information related to an account balance or a recent transaction.

Advantageously, the heating element 410 combined with the NFC chip 412 and the mobile application allows the temperature and color of a payment card to be changed without requiring a user to touch the payment card. This automatic color change of the payment card can be used to provide a user with messages, notify a user of issues related to the payment card (e.g., credit or security issues), and/or remind the user to take timely actions. Such notifications can be particularly advantageous in reducing computer and network resource usage and improving user experience.

In certain examples, the payment card 112 includes temperature sensor 416, which can be part of the heating element 410 or separate from the heating element 410. The temperature sensor 416 can be configured to obtain a temperature reading of the payment card 112 and transmit the reading via the NFC chip 412 to another component and/or device for processing. For example, the temperature sensor 416 can generate a temperature reading during a transaction involving the payment card 112 and pass the reading to the NFC chip 412 for transmitting to a mobile application executing on the device of the user. In certain examples, responsive to receiving the temperature reading, at least one of the device of the user (e.g., mobile device 103) or the payment service system 108 communicating with the mobile device 103 can use the temperature reading to confirm a physical location of the payment card 112 during the transaction, and then continue, stop, or report the transaction based on the confirmed physical location. Suppose, for example, that the payment card 112 is being used to make a transaction at a farmer's market or other outdoor location on the northeastern coast of the United States during winter. If the temperature reading of the payment card 112 is higher than an expected or actual outdoor temperature at the location, the temperature reading can indicate that the card is not physically present at the location, and this can indicate that the pending transaction is fraudulent. Thus, the mobile application or the payment service system 108 can stop the transaction, report the transaction, and/or recommend that action be taken (e.g., by the merchant) to confirm that the transaction is not fraudulent. On the other hand, a low temperature reading can indicate that the payment card 112 is being exposed to a temperature that is consistent with the location of the pending transaction. In such instances, the mobile device 103 or the payment service system 108 can permit the transaction to proceed.

In some examples, a camera, rather than the temperature sensor 416 included in the payment card 112, can be used to obtain a temperature reading of the payment card 112. A user can use the camera associated with the device of the user (e.g., a mobile phone camera) to take a picture of the payment card 112 involved in a transaction and communicate the picture to a mobile application of the device of the user. The mobile application can then detect the temperature of the payment card 112 based on the color of the card (e.g., black indicates the temperature is 50-60° F., or red indicates the temperature is 70-80° F.). Such information can be used to determine whether the payment card is being used in an expected location for a pending transaction. Based on the determined temperature or physical location of the payment card 112, the mobile application or the payment service system 108 can determine whether to continue, stop, or report the transaction. Therefore, the location information determined based on the temperature or color of the payment card 112 can be used to safeguard transactions and improve security associated with use of the card.

In some examples, the payment card 112 can include a biometric element 414 to further secure the use of the payment card. The biometric element 414 can be configured to obtain biometric information from the user and transmit the information to the mobile application executing on the device of the user via the NFC chip 412. The mobile application can send a signal to the heating element 410 to adjust the temperature of the payment card 112 based on the biometric information. In some examples, when a user puts his or her fingers on the payment card 112, the biometric element 414 can obtain the fingerprint of the user (e.g., through a fingerprint reader included in the biometric element) and transmit the obtained fingerprint to the mobile application. The mobile application can compare the obtained fingerprint with the fingerprint of an assigned user, and further communicate with the heating element 410 through the NFC chip 412 to adjust a temperature of the payment card 112 based on the comparison result. For example, the heating element 410 can be configured to adjust a temperature of the first region 302 or the second region 304 to reveal or conceal the account number in response to the communication received by the NFC chip from the mobile application. By applying heat with the heating element 410, for example, the account number can be revealed based on a fingerprint match (e.g., when the user touching the payment card is the assigned user). Likewise, the account number can remain concealed when there is a fingerprint mismatch (e.g., when the user touching the payment card is not the assigned user), by not applying heat with the heating element 410. Thus, the account number can be kept hidden when unauthorized users touch the card, thereby improving security. As described, the thermochromic ink may produce certain colors at certain temperatures (e.g., red at 70 degrees, white at 80 degrees, etc). The heating element, in communication with the payment application executing on the device of the user, may be controlled via the mobile application to cause the card to heat to a desired temperature in order to produce a particular color based on a transaction or other event caused by the user. For example, the user may activate an incentive associated with a merchant via the mobile app and a virtual card displayed with the user interface, and consequently cause an animation (e.g., virtual card turns to a color associated with the incentive or the merchant) to appear both on the user interface of the mobile application and also cause a corresponding color to appear on the physical card through temperature control via the heating element and the thermochromic ink.

Additionally or alternatively, in certain examples, the payment card 112 can include a graphical display, such as an electronic ink (E-Ink) display or an LCD display. The graphical display can be used to present information related to the payment card 112, a user of the payment card 112 (e.g., an image of the user), a transaction made with the payment card 112 (e.g., a payment amount), or a merchant associated with a transaction made with the payment card 112 (e.g., a name of the merchant) For example, in some instances, the graphical display can display an account number, an expiration date, and/or a CVV. Additionally or alternatively, the graphical display can be used to display a bar code or a QR code (Quick Response code). For example, the user may receive a gift card that includes a QR code or a bar code that can be presented to a merchant for payment. The graphical display can be used to display the QR code or bar code, which can then be presented to an optical scanner of the merchant for payment. Thus, the graphical display can be used to communicate e-gift card identifier information. Similarly, the graphical display can be used to communicate sports event ticket information, airline ticket information, or concert ticket information.

FIG. 5 is a flowchart of a method 500 of using a payment card, in accordance with certain examples. A payment card (e.g., payment card 112) is provided (step 502). The payment card includes an account number associated with an account of a user and has a thermochromic ink. In some examples, the payment card includes a card substrate and a personalization layer overlaying the card substrate. The personalization layer includes a first region and a second region. The first region includes the account number associated with the account of the user. The account of the user is maintained by a payment service system (e.g., the payment service system 108) that issues the payment card. At least one of the first region or the second region includes the thermochromic ink. The thermochromic ink is an ink that changes color when temperature increases or decreases. For example, when the user touches the card, body heat from the user can cause a color of the payment card. Additionally or alternatively, when the payment card is exposed to a new ambient temperature, the temperature and color of the payment card can change. In some examples, a temperature sensor in the card can be used to determine when the user has touched the card or when heat has otherwise been applied to (or removed from) the payment card, as described herein.

In certain implementations, the payment card includes a heating element (e.g., heating element 410) and an NFC chip (e.g., the NFC chip 412) that communicates with a mobile application executing on a device of the user. The mobile application can determine (step 504) that a color of the payment card should be changed (e.g., to reveal the account number or send a message to the user). In response, the user device can send (step 506) a signal to the NFC chip on the payment card. The NFC chip can then activate (step 508) the heating element to change a temperature and color of the payment card. The heating element can dynamically adjust a temperature of the payment card.

Application of heat to the payment card can cause a color change that reveals the account number of the payment card. Otherwise, the account number of the payment card may remain hidden from view, for example, if the payment card is at or around room temperature. In some examples, when heat is applied to the first region or the second region of the payment card having the thermochromic ink (e.g., when the user touches the first or second region), the color of the first or second region having the thermochromic ink can change. As a result, the account number can be revealed. In some examples, the first region and the second region are substantially identical in color at room temperature such that the account number included in the first region is invisible at room temperature. Advantageously, revealing the account number upon application of heat can prevent unnecessary or inadvertent exposure of the account number or other information on the card, thereby increasing security of the payment card and user account.

Chameleon Card

In some implementations, the payment card 112 can be or include a metal substrate and/or can have randomized colors or a random color variation across the surface. Such a card can be referred to herein as a "chameleon card." FIG. 6 includes perspective views of front and back sides of a chameleon card 600. The front side of the chameleon card 600 includes at least three regions 602, 604, and 606. Each region 602, 604, and 606 can have a unique or different color based on different thermochromic inks used in each region. The different colors can be present when a temperature of the card 600 is uniform (e.g., throughout the card) or non-uniform. The thermochromic inks can be selected and positioned to hide key information of the card 600 while displaying random colors. For example, as depicted, the account number associated with the card can be invisible in the regions 602, 604, or 606. When a user touches the card 600 to apply body heat or a heating element embedded in the card applies heat to the card 600 in response to receiving a signal, the color of one or more regions 602, 604, or 606 can change to reveal the account number. Likewise, the back side of the chameleon card 600 can include regions 608, 610, and 612 that display different colors. For example, the regions 608 and 612 on the back side may be opposite of the region 602 on the front side and/or may show different colors (e.g., a darker color) based on a selection and arrangement of the thermochromic inks on the card 600. Additionally or alternatively, the colors on the front side and/or the back side of the card 600 can be arranged to present customized shapes or images. For example, the card 600 can be designed and colored based on personalized artwork from a cardholder. In general, the chameleon card 600 can be visually appealing to attract users and improve an overall user experience.

Furthermore, the payment card 600 may be manufactured in a way such that various semi-reflective or other ink colors are randomly printed across the upper and/or lower surfaces of the card substrate or other layer of the card. In this way, the payment card appears in a chameleon style and may appear to change colors to the user as the card is rotated. This style of card may include thermochromic ink or other ink or dyes (e.g., normal or non-thermochromic) so long as various colors are printed randomly along the surface. In one embodiment, changes in color to the chameleon card may be triggered by a detected change in environmental temperature using the temperature sensor, thermochromic ink, and/or heating element as described above. The various colors or color combinations used to print the card may be selected by the user via input on a user interface associated with the mobile application. For example, the user may select a base color of red for their chameleon card and the resulting card can have random colors of red hues printed on the card. In one embodiment, the payment service may utilize machine learning algorithms to select or suggest complementary colors to at least one desired color selected by a user, and based on users having similar profiles to the selecting user, for printing the various colors on the payment card.

In some examples, the randomized coloring can be achieved by varying concentrations of thermochromic pigments across the front and/or back sides of the card 600. For example, the front and/or back sides can include a mixture of two or more different thermochromic pigments, and the concentrations of the pigments can be varied to achieve a range of colors on the front and/or back sides. Each of the regions 602, 604, and 606, for example, can have a unique combination of the thermochromic pigments. In general, the composition of thermochromic pigments can vary across the card to achieve randomized colors and/or present images at any given temperature.

Chameleon Card Packaging

Figure 7:
FIG. 7 is a perspective view of the payment card of FIG. 6 placed in a packaging container, in accordance with certain examples.

FIG. 7 depicts a chameleon card 700 placed in a packaging container 702, in accordance with certain examples. Current card packaging designs usually have notches to hold a payment card; however, the "notched" card holder design can sometimes damage the card during transit. By comparison, the packaging container 702 utilizes a holding tray 704 that has ridges 706 for achieving a friction fit with an outer perimeter of the card 700. The holding tray 704 may be made of paper and/or foam and is configured to secure the card in position, while providing cushion to protect the card during transit.

Figure 8B:
FIG. 8B includes a series of images illustrating the packing assembly of FIG. 8A and a mailer, in accordance with certain examples.

FIGS. 8A and 8B illustrate a process 800 for packaging the chameleon card 700 (or other payment card) in the packaging container 702. The holding tray 704 is glued (step 802) in a box 804 with a top of the tray 704 facing a hinged lid 806 of the box 804. A quick response (QR) label is applied (step 808) to an inner side of the lid 806, which includes a protrusion 809. The protrusion 809 can be used in conjunction with the ridges 706 of the holding tray 704 to support the chameleon card 700 and/or to provide a friction fit that holds the chameleon card 700 in place. The chameleon card 700 can be pressed (step 810) into the holding tray 704. The box 804 is then closed (step 812) and placed (step 814) into an envelope or mailer 816, which can be shipped to the card holder.

Figure 9B:
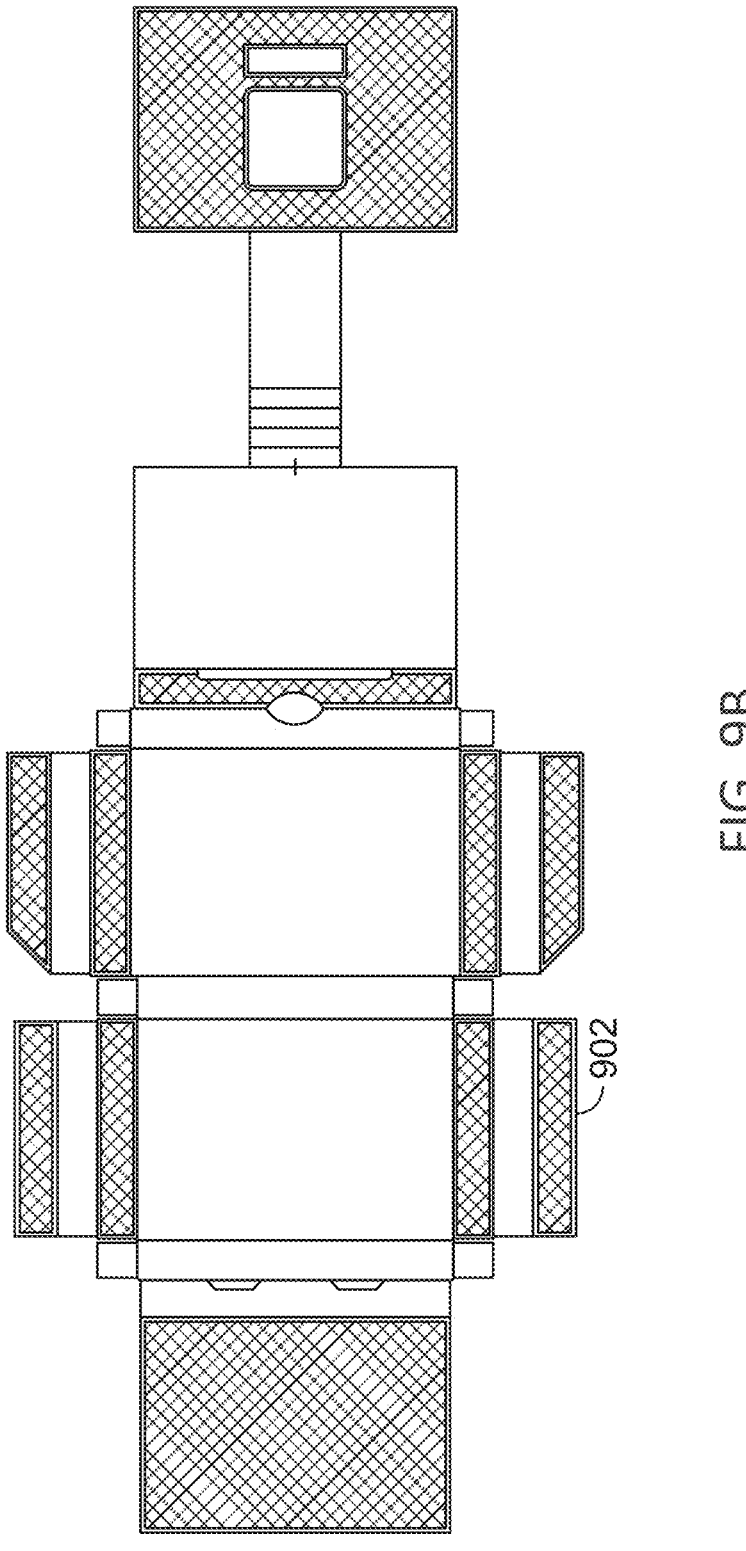
FIG. 9B includes an image of a packing box for a payment card, in accordance with certain examples.

FIGS. 9A and 9B include a variety of views of packaging components that can be used to ship a payment card, such as the chameleon card. FIG. 9A includes top, bottom, front, section, and side views of the holding tray 704. For example, the ridges 706 can be seen in the front view and the section view of the holding tray 704. The box 702, inner mailer 814, and outer mailer 816 can be made of recyclable paper and/or include a padded lining FIG. 9B includes an image of a cutout 902 for forming a box (e.g., the box 804), which can be made of uncoated kraft folding board.

Computer Implementation

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some examples, a service can be software that resides in memory of a client device and/or one or more servers of a content management system and perform one or more functions when a processor executes the software associated with the service. In some examples, a service is a program, or a collection of programs that carry out a specific function. In some examples, a service can be considered a server. The memory can be a non-transitory or transitory computer-readable medium.

In some examples the computer-readable storage devices, mediums, and memories can include a cable or wireless signal containing a bit stream and the like. However, when mentioned, transitory computer-readable storage media are media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Having now fully set forth examples and certain modifications of the concept underlying the present invention, various other examples as well as certain variations and modifications of the examples shown and described herein will obviously occur to those skilled in the art upon becoming familiar with said underlying concept.

What is claimed is:

1. A payment card comprising:
a hardware chip embedded in a card substrate;
a biometric element embedded in the card substrate;
a heating element embedded in the card substrate;
the card substrate, wherein a surface of the card substrate comprises at least one thermochromic ink at a region of the card substrate, wherein a different color of the at least one thermochromic ink presents at the region responsive to changes in temperature initiated by the heating element in response to use of the biometric element of the payment card; and
a graphical display, wherein the graphical display included in the payment card comprises an LCD display for displaying different information at different times that is associated with at least one of the payment card or a user account.

2. The payment card of claim 1, wherein the at least one thermochromic ink visibly obfuscates a balance of the payment card without a change in temperature to present the different color of the region.

3. The payment card of claim 2, wherein the change in temperature is responsive to a user touching the payment card.

4. The payment card of claim 2, wherein the change in temperature is responsive to a user touching the region of the card substrate.

5. The payment card of claim 1, wherein the at least one thermochromic ink has a substantially identical color at room temperature as at least one other region of the card substrate.

6. The payment card of claim 1, wherein the hardware chip embedded in the card substrate is a near field communication (NFC) chip.

7. The payment card of claim 1, wherein the heating element is configured to cause a temperature of the payment card to change responsive to a signal.

8. The payment card of claim 1, wherein a change in temperature to present the different color of the region reveals additional information to the information displayed by the graphical display.

9. The payment card of claim 1, wherein the information displayed by the graphical display is presented for capture by an optical scanner.

10. The payment card of claim 1, wherein the different information comprises a QR code or a bar code and at least one of an account number, an expiration date, or a card verification value.

11. The payment card of claim 1, wherein the different color of the at least one thermochromic ink presents at the region responsive to changes in ambient temperature of a physical location of the payment card, and wherein a color of the at least one thermochromic ink is used to confirm the physical location of the payment card during a transaction using the payment card.

12. A payment card comprising:
a hardware chip embedded in a card substrate;
a biometric element embedded in the card substrate;
a heating element embedded in the card substrate;
the card substrate, wherein a surface of the card substrate comprises at least one thermochromic ink at a region of the card substrate, wherein a different color of the at least one thermochromic ink presents at the region responsive to changes in temperature initiated by the heating element in response to use of the biometric element of the payment card; and
a graphical display comprising an LCD display that is controllable to display different information associated with at least one of the payment card or a user account at different times.

13. The payment card of claim 12, wherein the at least one thermochromic ink visibly obfuscates an expiration date or a card verification value (CVV) without a change in temperature to present the different color of the region.

14. The payment card of claim 13, wherein the change in temperature is responsive to a user touching the payment card.

15. The payment card of claim 13, wherein the change in temperature is responsive to a user touching the region of the card substrate.

16. A payment card comprising:
a card substrate, wherein a surface of the card substrate comprises at least one thermochromic ink at a region of the card substrate, wherein a different color of the at least one thermochromic ink presents at the region responsive to changes in temperature initiated by a heating element in response to use of a biometric element of the payment card, and wherein a change in temperature to present the different color of the region reveals information associated with the payment card or with a user account;
a hardware chip embedded in the card substrate;
the biometric element embedded in the card substrate;
the heating element embedded in the card substrate; and
a graphical display comprising an LCD display, wherein the graphical display, included in the payment card with the card substrate having the surface comprising the at least one thermochromic ink, is configured for displaying additional information associated with at least one of the payment card or the user account.

17. The payment card of claim 16, wherein the information includes at least one of a notification of one or more issues related to the payment card or a reminder to take one or more timely actions.

18. The payment card of claim 17, wherein the one or more issues include at least one of a credit issue or a security issue.

19. The payment card of claim 16, wherein the information includes a message.

20. The payment card of claim 19, wherein the message includes at least one of:
one or more letters;
one or more numbers;
a trademark;
a logo;
information related to an account balance; or
information related to a recent transaction.

* * * * *